(12) United States Patent
Jasinska-Walc et al.

(10) Patent No.: US 12,497,513 B2
(45) Date of Patent: Dec. 16, 2025

(54) MODIFIED BITUMEN COMPRISING A COMPATIBILIZER, A COMPATIBILIZER AND ITS USE IN ASPHALT, ROOFING OR ROAD APPLICATIONS

(71) Applicant: SABIC GLOBAL TECHNOLOGIES B.V., Bergen Op Zoom (NL)

(72) Inventors: Lidia Jasinska-Walc, Veldhoven (NL); Robbert Duchateau, Roostenlaan (NL); Miloud Bouyahyi, Eindhoven (NL); Nydia Badillo Sampedro, Maastricht (NL); Maciej Sienkiewicz, Gdańsk (PL); Mateusz Malus, Gdańsk (PL); Przemyslaw Gnatowski, Czeremcha (PL); Johannes Peter Antonius Martens, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 360 days.

(21) Appl. No.: 18/036,711

(22) PCT Filed: Nov. 8, 2021

(86) PCT No.: PCT/EP2021/080930
§ 371 (c)(1),
(2) Date: May 12, 2023

(87) PCT Pub. No.: WO2022/101132
PCT Pub. Date: May 19, 2022

(65) Prior Publication Data
US 2023/0416532 A1 Dec. 28, 2023

(30) Foreign Application Priority Data
Nov. 12, 2020 (EP) ..................... 20207103

(51) Int. Cl.
*C08L 95/00* (2006.01)

(52) U.S. Cl.
CPC ........... *C08L 95/00* (2013.01); *C08L 2207/22* (2013.01); *C08L 2555/84* (2013.01)

(58) Field of Classification Search
CPC .. C08L 95/00; C08L 2207/22; C08L 2555/84; C08L 2555/22; C08L 2555/80; C08L 23/0846; C08L 23/147
(Continued)

(56) References Cited

U.S. PATENT DOCUMENTS 3,629,164 A 12/1971 Smith et al.
4,455,149 A 6/1984 Satake et al.
(Continued)

FOREIGN PATENT DOCUMENTS

CN 1914253 A * 2/2007 ........... C08G 77/442
CN 106700578 B * 8/2019 .............. C08L 95/00
(Continued)

OTHER PUBLICATIONS

Characterizaqtion of End Functionalized Styrene Butadiene Styrene Copolymers and Their Application in Modified Asphalt Journal Applied Polymer Science vol. 103 8-16 (2007) (Year: 2007).*
(Continued)

*Primary Examiner* — Pamela H Weiss
(74) *Attorney, Agent, or Firm* — CANTOR COLBURN LLP (57) ABSTRACT

The present invention relates to an asphalt composition comprising a modified bitumen with a hydroxyl-functionalized polymer configured to create a thermally reversible cross-linking network within the composition, wherein the hydroxyl functionalized polymer is selected from the group comprising: hydroxyl functionalized polyolefin thermoplast, hydroxyl functionalized polyolefin elastomer, hydroxyl functionalized polyolefin plastomer.

20 Claims, 6 Drawing Sheets

(58) Field of Classification Search
USPC .................................................... 525/54.5
See application file for complete search history.

(56) References Cited

U.S. PATENT DOCUMENTS

| | | | |
|---|---|---|---|
| 6,759,453 | B2 | 7/2004 | Jelling et al. |
| 2010/0056674 | A1 | 3/2010 | Morifusa |
| 2010/0143651 | A1* | 6/2010 | Silvis .................. C08L 23/0815 36/98 |
| 2016/0017148 | A1* | 1/2016 | Ruan ...................... D06N 5/003 524/64 |
| 2017/0203055 | A1* | 7/2017 | Chen ..................... A61M 15/00 |

FOREIGN PATENT DOCUMENTS

| | | | | |
|---|---|---|---|---|
| EP | 1081193 | A1 * | 3/2001 | .............. C08L 95/00 |
| FR | 2819818 | B1 | 4/2003 | |
| JP | 5556168 | A | 4/1980 | |
| WO | 2020160423 | A1 | 8/2020 | |

OTHER PUBLICATIONS

CN1649965A Translation (Year: 2005).*
CN194253A Translation (Year: 2007).*
KR20130076298A Translation (Year: 2013).*
CN106700578b Translation (Year: 2019).*
CN106700578B MT (Year: 2019).*
International Search Report for International Application No. PCT/EP2021/080930, International Filing Date Nov. 8, 2021, Date of Mailing Feb. 2, 2022, 5 pages.
Jew. P. et al "Polyethylene-Modified Bitumen for Paving Applications", Journal of Applied POlymre Sicence, vol. 31, 2685-2704 (1986).
Written Opinion for International Application No. PCT/EP2021/080930, International Filing Date Nov. 8, 2021, Date of Mailing Feb. 2, 2022, 6 pages.

* cited by examiner

MODIFIED BITUMEN COMPRISING A COMPATIBILIZER, A COMPATIBILIZER AND ITS USE IN ASPHALT, ROOFING OR ROAD APPLICATIONS

CROSS REFERENCE TO RELATED APPLICATIONS

This application is a National Stage application of PCT/EP2021/080930, filed Nov. 8, 2021, which claims the benefit of European Application No. 20207103.1, filed Nov. 12, 2020, both of which are incorporated by reference in their entirety herein.

TECHNICAL FIELD OF THE INVENTION

The present invention relates to a modified bitumen, a compatibilizer for an asphalt and its use in roofing application or road application.

TECHNOLOGICAL BACKGROUND OF THE INVENTION

Asphalt is used in a variety of applications, but by far the major use is in road construction and roofing application.

Asphalt is generally constituted from a mixture comprising bitumen and mineral and optionally additives as polymers, in particular polyolefins in order to enhance the bitumen properties. Indeed, for quite a number of years researchers have demonstrated that the addition of certain polymers as for example, from 3 to about 8 wt % or more, can enhance the properties of asphalt: increasing toughness, tenacity, tack, elasticity, impact resistance, and resistance to deformation at low/high temperatures.

Indeed, at low temperatures asphalt can turn brittle and crack. At high temperatures, it can also soften when under the weight of heavy trucks passing over it. In the summer, a road may be 80-100 F hotter than it is in winter and for every 100 F rise in temperature, the asphalt is a million times softer. Though it never actually runs off the road, it does creep into ridges and ruts, which make driving dangerous. An asphalt road would hold up better with more built-in sturdiness.

Polymers work by creating a kind of support matrix within the asphalt. A seminal paper by JEW et al (J. Appl. Polym. Sci, 31.2685-2704 (1986)) confirmed that 8 wt % polyethylene in a bitumen mixture can increase flexural strength/modulus, elongation and fracture energy.

These investigators concluded that the presence of polyethylene in hot-mix paving materials can extend the service temperature range at both high and low temperatures, thereby simultaneously reducing both pavement distortion (rutting) and low temperature cracking, so that pavement lifetime can be more than doubled.

These investigators also suggested the use of a tri-block copolymer to control the stability of the mixture, particle size and compatibility of the dispersed polyethylene phase.

However, this approach is not economically feasible due to the high weight percent of the polymers used and the costs for processing the asphalt-polymer blend.

However, while a number of thermoplastics can confer the above properties to asphalt to a surprisingly high degree, there remains a serious problem, which the polymer generally does not address. This involves the difference in interfacial surface energy between the bitumen, minerals aggregate and the polymers. The aggregate is highly hydrophilic while most polymers tend to be very hydrophobic. The poor adhesion between the two, results in delamination of the materials, particularly during freeze-thaw cycles, high temperatures and the exposure to salt, oil, gasoline, water etc.

In addition, due to the hydrophilic/hydrophobic properties of the constituents of the asphalt, it is particularly difficult to obtain a good dispersion of the polymers with the bitumen, and it is a costly problem for polyolefins, most of the time requiring special high energy mixing equipment.

Those problems have been solved by the use of a compatibilizer, a polyolefin with a hydrophilic part and a hydrophobic part which have the role of interface between the constituents of the minerals, bitumen and the polyolefins.

U.S. Pat. No. 6,759,453 B2 discloses such compatibilizer: polymers which have been functionalized so as to be able to chemically react with polyamines to form adducts containing at least one or more groups consisting of amino, amido, imino, imido, or imidazloyl.

The functionalized polymer, when mixed with bitumen and polymer, provides an excellent paving composition with improved physical properties and enhanced anti-stripping properties.

However, such asphalt composition must be applied to its final use before the asphalt cools down and become solid. Indeed, once cooled, such asphalt cannot be reprocessed without losing its properties. In addition, such asphalt composition have also the drawback to lose their stability if they are stored at high temperature during a long period of time. This fact is related with the lack of chemical and physical interactions between a non-polar polymer and polar bitumen constituents such as the asphaltenes or resins, so it finally results in a system instability.

Therefore there is a need for a new composition allowing hot storage during a longer period of time and the capability to reprocess asphalt once cooled, and recycle asphalt composition through an economical method.

SUMMARY

This object is achieved by the present invention.

In a first aspect the present invention relates to modified bitumen comprising a randomly hydroxyl-functionalized polymer or with a graft copolymer containing said randomly functionalized polymer and styrene-maleic-anhydride copolymer (PO-graft-SMA), configured to create a thermally reversible cross-linking network within the bitumen wherein the randomly hydroxyl functionalized polymer is selected from the group comprising: hydroxyl functionalized polyolefin thermoplast or hydroxyl functionalized polyolefin elastomer, hydroxyl functionalized polyolefin plastomer.

The thermal reversible cross-linking network within the composition allows the modified bitumen to be reheated once cooled without losing its properties. The network behaves similar as a multiblock copolymer when applied as compatibilizer, ensuring a much higher degree of entanglement with the matrix and dispersed phase than a linear block copolymer. Despite the network formation, the cross-linked material is moldable at elevated temperatures due to the thermally reversible behavior of the crosslinks allowing to reprocess cooled asphalt and even recycle old asphalt/bitumen into the composition of new asphalt.

In an embodiment, the amount of hydroxyl functional groups ranges between 1 and 8 per polymer chain and the hydroxyl functionality level is at least 0.05 mol % of the total polymer, preferentially superior to 0.1 mol % of the total polymer.

In an embodiment, the hydroxyl functionalized polymer in the amount between 0.5 and 10 wt % based on the weight of the composition, preferentially less than 5 wt %, preferably about 1 to 2.5 wt %, more preferably about 1 wt % based on the weight of the composition.

In an embodiment, the hydroxyl functionalized olefin is selected from the group comprising hydroxyl functionalized-HDPE, -LDPE, -ethylene-copolymers (LLDPE), -PP, -propylene copolymers, preferably poly(ethylene-co-5-hexen-1-ol), poly(ethylene-co-10-undecen-1-ol), poly(propylene-co-5-hexen-1-ol), poly(propylene-co-10-undecen-1-ol), or a mixture of them.

In an embodiment, the hydroxyl functionalized elastomer or plastomer is based on an elastomer or plastomer selected from the group comprising: poly(ethylene-co-propylene), poly(ethylene-co-1-butene), poly(ethylene-co-1-hexene), poly(ethylene-co-1-octene), poly(ethylene-co-norbornene), atactic polypropylene, poly(propylene-co-1-butene), poly(propylene-co-1-hexene), poly(propylene-co-1-octene), containing additional hydroxyl functional comonomer, preferably poly(ethylene-co-1-hexene-co-5-hexen-1-ol), poly(ethylene-co-1-hexene-co-10-undecen-1-ol), poly(propylene-co-1-hexene-co-5-hexen-1-ol), poly(propylene-co-ethylene-co-5-hexen-1-ol), poly(propylene-co-1-hexene-co-10-undecen-1-ol), poly(propylene-co-ethylene-co-10-undecen-1-ol), poly(ethylene-co-1-octene-co-5-hexen-1-ol), poly(ethylene-co-1-octene-co-10-undecen-1-ol), poly(ethylen-co-norbornene-co-5-hexen-1-ol) poly(ethylen-co-norbornene-co-10-undecen-1-ol) or a mixture of them, with a $T_m$ preferably below 150° C., preferably below 140° C.

In an embodiment, the hydroxyl functionalized polymer has been reacted with styrene-maleic-anhydride (SMA) to obtain polymer grafted SMA (PO-graft-SMA).

In an embodiment, the PO-graft-SMA content is in the range of 1 to 10 wt %, preferably 1 to 5 wt %, more preferentially 1 to 2.5 wt %, where PO stands for polyolefin thermoplast, plastomer or elastomer.

In an embodiment, the POE-graft-SMA content is in the range 1 to 10 wt %, preferably 1 to 5 wt %, more preferentially 1 to 2.5 wt %.

In an embodiment, the PO-graft-SMA is a PP-graft-SMA.

In an embodiment, the bitumen is refinery- or cracker leftover or re-used pavement material or re-used asphalt.

In an embodiment, at least one, preferably 2, more preferably 3, more preferably 4 of the following parameter are achieved:

Viscosity at 180° C. [Pas]: <2 Pas, preferably <1 Pas
Avg. Softening point [° C.]: >45.7
Δ penetration after aging: <10, preferably <5
Δ softening point after aging: <10, preferably <5

A second aspect of the invention is a compatibilizer for asphalt comprising PO-graft-SMA wherein the amount of PO is between 60 and 95 wt %, preferentially between 70 and 90 wt %, more preferentially above wt % and the amount of SMA is between 5 and 40 wt %, preferentially between 10 and 30 wt % more preferentially below 20 wt %, where the PO is a polyolefinic thermoplast, a polyolefin plastomer (POP) or polyolefin elastomer (POE) such as, but not limited to HDPE, LDPE, LLDPE, VLDPE, ULDPE, EPR, aPP, iPP, sPP, propylene-α-olefin copolymers.

In an embodiment, the amount of PO of the compatibilizer is between 60 and 90 wt %, preferably and 80 wt %, preferentially between 70 and 75 wt % and amount of SMA is between 10 to 40 wt %, preferably to 35 wt %, preferentially between 25 and 30 wt %.

A third aspect of the invention is the use of an asphalt composition according to the invention or comprising a compatibilizer according to the invention, for roofing application or road application.

It is noted that the invention relates to all possible combinations of features described herein, preferred in particular are those combinations of features that are present in the claims. It will therefore be appreciated that all combinations of embodiments; features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous as it offers a simpler, more economical process for the preparation of the product/composition. Similarly, it is also to be understood that a description on a process comprising certain steps also discloses a process consisting of these steps. The process consisting of these steps may be advantageous as it offers a simpler, more economical process.

When values are mentioned for a lower limit and an upper limit for a parameter, ranges made by the combinations of the values of the lower limit and the values of the upper limit are also understood to be disclosed.

DETAILED DESCRIPTION

The present invention preferably relates to a new asphalt composition allowing hot storage during a long time and be able to reprocess asphalt once cooled and recycle asphalt composition.

In order to obtain such properties, a compatibilizer is added to the asphalt composition, which is a mixture of bitumen (leftover of cracker (nonvolatile residue of the cracker) or re-used pavement material or re-used asphalt) and polymer in particular polyolefin (PO) such as HDPE, LDPE, LLDPE, VLDPE, ULDPE, EPR, aPP, iPP, sPP, propylene-α-olefin copolymers. These polyolefins can either be virgin or recycled polyolefins.

Such compatibilizer must be able to create a thermally reversible cross-linking network within the composition, which is achieved by using a randomly hydroxyl-functionalized polymer more preferably a hydroxyl functionalized polyolefinic thermoplast, hydroxyl functionalized polyolefin elastomer, hydroxyl functionalized plastomer or a mixture of them, optionally coupled to SMA forming a polyolefin-SMA graft copolymer, PO-graft-SMA.

In order to obtain such thermally reversible cross-linking network, the amount of randomly hydroxyl functional groups may range between 1 and 8 per polymer chain, in order to reach a hydroxyl functionality level of at least 0.05 mol % of the total polymer, which is sufficient to create such network.

It is essential for the invention to obtain a proper cross-linking network that the hydroxyl-functionalized group are generated randomly, on order to avoid polymer having only group to the head and/or end of the polymer chain which tent to form weak network.

The hydroxyl functionality level is determine by $^1$H NMR spectroscopy characterization wherein the mol % of functionalization was determined by $^1$H NMR analysis carried out at 130° C. using deuterated tetrachloroethane (TCE-D2) as solvent and recorded in 5 mm tubes on a Varian Mercury spectrometer operating at a frequency of 400 MHz. Chemical shifts are reported in ppm versus tetramethylsilane and were determined by reference to the residual solvent protons. In this application, hydroxyl functionality level includes the quantity of OH group within the polymer, but also of the quantity of OH group, which has been reacted with SMA and are no longer present in the reaction product.

Preferably, the randomly hydroxyl-functionalized polymer is essentially a saturated functionalized polymer in the main chain, as a saturated functionalized polymer is more stable in comparison to unsaturated functionalized polymer having unsaturations in the main chain.

When a hydroxyl functionalized polyolefin (where the polyolefin is a thermoplast, plastomer or elastomer) or the graft copolymer containing functionalized polyolefin and styrene-maleic-anhydride copolymer (PO-graft-SMA) is used as compatibilizer within the asphalt composition, an amount between 0.5 and 10 wt % based on the weight of the composition, about 1 wt % to 5 wt % based on the weight of the composition is preferred in order to an improvement of the product properties, more preferably, an amount of about 1 to 2.5 wt %. Besides, the graft copolymer, PO-graft-SMA, prepared via a solution grafting process affects the properties of bitumen more efficiently in comparison to the PO-graft-SMA graft copolymer prepared via a melt extrusion process. This difference is due to the fact that the coupling of the hydroxyl functionalized polyolefin and SMA is more efficient in a solution than during reactive extrusion. The reaction in a solution is carried out for several hours while the reactive extrusion process lasts only a few minutes. Most probably the time of reactive extrusion is not sufficient to fully accomplish the copolymerization as the hydroxyl functionalized polyolefin and SMA are immiscible polymers. The hydroxyl functionalized polyolefin can be selected from the group comprising: hydroxyl functionalized-HDPE, -LDPE, -ethylene-copolymers (LLDPE), -PP, -propylene copolymers, preferably poly(ethylene-co-5-hexen-1-ol), poly(ethylene-co-10-undecen-1-ol), poly(propylene-co-5-hexen-1-ol), poly(propylene-co-10-undecen-1-ol), or a mixture of them. The hydroxyl functionalized elastomer and plastomer is based on an elastomer or plastomer selected from the group comprising: poly(ethylene-co-propylene), poly(ethylene-co-1-butene), poly(ethylene-co-1-hexene), poly(ethylene-co-1-octene), poly(ethylene-co-norbornene), atactic polypropylene, poly(propylene-co-1-butene), poly(propylene-co-1-hexene), poly(propylene-co-1-octene), containing additional hydroxyl functional comonomer, preferably poly(ethylene-co-1-hexene-co-5-hexen-1-ol), poly(ethylene-co-1-hexene-co-10-undecen-1-ol), poly(propylene-co-1-hexene-co-5-hexen-1-ol), poly(propylene-co-ethylene-co-5-hexen-1-ol), poly(propylene-co-1-hexene-co-poly(propylene-co-ethylene-co-10-undecen-1-ol), poly(ethylene-co-1-octene-co-5-hexen-1-ol), poly(ethylene-co-1-octene-co-10-undecen-1-ol), poly(ethylen-co-norbornene-co-5-hexen-1-ol), poly(ethylen-co-norbornene-co-10-undecen-1-ol) or a mixture of them, with a $T_m$ preferably below 150° C., preferably below 140° C.

In a preferred embodiment, the hydroxyl functionalized polymer has been reacted with SMA to obtain the corresponding grafted copolymer, PO-graft-SMA, wherein the amount of polyolefin (PO) is between and 95 wt %, preferentially between 70 and 90 wt %, more preferentially above 80 wt % and the amount of SMA is between 5 and 40 wt %, preferentially between 10 and 30 wt % more preferentially below 20 wt %, where the PO is a polyolefinic thermoplast, a polyolefin plastomer (POP) or polyolefin elastomer (POE) such as, but not limited to HDPE, LDPE, LLDPE, VLDPE, ULDPE, EPR, aPP, iPP, sPP, propylene-α-olefin copolymers.

The best result might be reached when the wt % of PO-graft-SMA is between 1 to 5 wt %, preferably 1 to 2.5 wt % of the total composition.

Accordingly, an asphalt following the invention achieves at least one, preferably 2, more preferably 3, more preferably 4 of the following parameters:

Viscosity at 180° C. [Pas]: <2 Pas, preferably <1 Pas

Avg. softening point [° C.]: >45.7

Δ penetration after aging: <10, preferably <5

Δ softening point after aging: <10, preferably <5

The following composition are within the range of the invention. Accordingly, the asphalts obtain by such composition achieve at least one, preferably 2, more preferably 3, more preferably 4 or 5 of the above mentioned parameters.

EXAMPLES

Typical Preparation Procedure of poly(propylene-graft-2-hydroxyethyl succinimide) (iPP-graft-OH) by Reactive Extrusion Process iPP-graft-MAH (Exxelor P01020, 0.94 mol % MAH, 10.0 g, $M_n$=22 kg·mol$^{-1}$, Đ=4.4) with antioxidant Irganox 1010 (2500 ppm) were introduced under nitrogen atmosphere into a mini-extruder chamber having three different temperature zones of 160° C., 180° C. and 190° C., respectively. The screw rotation rate was set at 100 rpm. After one minute, ethanolamine (0.08 g, 0.44 mmol, 3-fold excess in comparison to the amount of MAH grafted onto iPP-graft-MAH) was added through the syringe. The mixture was processed for 60 seconds and the mini-extruder chamber was evacuated. The OH-functionalized polypropylene was purified by dissolution in xylenes at 120° C. and precipitated in cold acetone followed by drying in a vacuum oven for 24 hours at 40° C.

Typical Preparation Procedure of iPP-graft-SMA by Reactive Extrusion Process with 9 wt % of SMA iPP-graft-OH ($M_n$=26.9 kg·mol$^{-1}$, $M_w$=106.2 kg·mol$^{-1}$, Đ=3.9, $T_m$=153.4° C., $\Delta H_m$=110.0 J·g$^{-1}$, FG/chain~1, 910 g) was premixed with Sn(Oct)$_2$ (5 g, 0.012 mol) dissolved in heptane (200 mL), stirred at 100° C. for 1 hour, precipitated in methanol and then dried in the oven. The Sn(Oct)$_2$-treated PP-graft-OH (915 g) and SMA ($M_n$=36.3 kg·mol$^{-1}$, $T_g$=150° C.) (90 g) were fed in co-rotating twin screw extruder at 120-170-180-190-210-210-190-175-155° C. with a screw rotation speed of 100 rpm. The mixture was processed, and then cooled and granulated. The product was not soluble in o-DCB and therefore not analyzed by SEC. $T_m$=154.2° C., $\Delta H_m$=96.8 J·g$^{-1}$.

Typical Preparation Procedure of iPP-graft-SMA by Reactive Extrusion Process with 11 wt % of SMA The same procedure as above using 889 g of iPP-graft-OH and 111 g of SMA was applied. The product was not soluble in o-DCB and therefore not analyzed by SEC. $T_m$=153.9° C., $\Delta H_m$=88.4 J·g$^{-1}$.

Typical Preparation Procedure of iPP-graft-SMA by Reactive Extrusion Process with 14 wt % of SMA The same procedure as above using 857 g of iPP-graft-OH and 143 g of SMA was applied. The product was not soluble in o-DCB, and therefore not analyzed by SEC. $T_m$=154.5° C., $\Delta H_m$=104.8 J·g$^{-1}$.

Typical Preparation Procedure of poly(ethylene-co-1-octene-graft-(2-hydroxyethyl succinimide)) (POE-graft-OH) by Reactive Extrusion POE-graft-MAH (Engage 8407-graft-MAH [POE-graft-MAH] $M_n$=18.1 kg·mol$^{-1}$, $M_w$=65.2 kg·mol$^{-1}$, Đ=3.6, $T_m$=109.4° C., $\Delta H_m$=114.9 J·g$^-$, FG/chain~1 or Elite AT6111-graft-MAH [POE-graft-MAH] $M_n$=23.7 kg·mol$^{-1}$, $M_w$=71.1 kg·mol$^{-1}$, Đ=3.0, $T_m$=64.4° C., $\Delta H_m$=29.8 J·g$^{-1}$, FG/chain~1) (2000 g) with antioxidant Irganox 1010 (2500 ppm) and TBPP (tris[2,3-dibromopropyl] phosphate) (2500 ppm) were introduced under nitrogen atmosphere into a co-rotating twin screw extruder at 120-150-180-230-230-230-230-230-230° C. with a screw rotation speed of 200 rpm. After one minute, a 3-fold excess of ethanolamine in comparison to the amount of MAH grafted onto POE-graft-MAH (for Engage 8407-graft-MAH: 24.3 g, 0.13 mol; for Elite AT6111-graft-MAH: 28.4 g, 0.16 mol) was added. The mixture was processed, and then cooled and granulated.

Typical Preparation Procedure of poly(ethylene-co-1-octene-graft-styrene-co-maleic anhydride) (POE-graft-SMA) by Reactive Extrusion Process with 11 wt % of SMA POE-graft-OH (0.89 kg; 0.1 mol MAH, POE-graft-OH #1 (derived from Engage 8407-graft-MAH), FG/chain~1, POE-graft-OH #2 (derived from Elite AT6111-graft-MAH), FG/chain~1) with antioxidant Irganox 1010 (2500 ppm) and titanium (IV) isopropoxide (5 g, 17.6 mmol, 1:5 molar ratio of catalyst to —OH groups in the polymer) were premixed with SMA (0.11 kg) and introduced under nitrogen atmosphere into a co-rotating twin screw extruder at 120-150-180-230-230-230-230-230-230° C. with a screw rotation speed of 200 rpm. The mixture was processed, and then cooled and granulated.

Typical Preparation Procedure of Isotactic poly(propylene-co-1-hexene-co-10-undecen-1-ol)

The polymerization reaction was carried out in a stirred 20 L stainless-steel fed-batch BÜCHI reactor. Prior to the polymerization, the reactor was dried by vigorously stirring a solution of TiBA (20.0 mL, 1.0 M in toluene) in 15 L of pentamethylheptane (PMH) solvent for about one hour. After draining the washing solvent and drying, the reactor was refilled with PMH solvent (15 L) and heated up to 50° C. In the glovebox, solutions of TiBA (20 mL, 1.0 M in toluene) and MAO (5 mL, 2.25 M solution in toluene) were prepared, which were injected (0.5 bar N$_2$ overpressure) into the reactor. Subsequently, the predefined amounts of 1-hexene (13 mL, 105 mmol) and TiBA-protected 10-undecene-1-ol (mol ratio 1:1, 25 mL, 25 mmol) prepared in a glovebox were injected into the reactor (0.5 bar N$_2$ overpressure). Next, the reactor was vented off to 1 bar of nitrogen under stirring (300 RPM). The mixture was heated up to 80° C. and saturated with gaseous propylene (5 bar propylene partial pressure). In a glovebox, a pre-activated solution of rac-Me$_2$Si(2-Me-4-Ph-Ind)$_2$ZrCl$_2$ precatalyst (0.8 μmol, 0.5 mg dissolved in 5 mL toluene containing TiBA (1.6 wt %)) with MAO (2 mL, 2.25 M solution in toluene) was prepared and was transferred into the reactor under the polymerization conditions followed by the addition of a DEZ solution (1.0 mL, 1.5 M in toluene) applying an additional 0.5 bar N$_2$ overpressure for introducing each injection. The propylene pressure in the reactor was automatically maintained at 5 bar partial propylene pressure and the uptake of propylene was measured by a mass flow meter (Bronkhorst). At the end of the reaction, the reactor was vented off to 1 bar and the mixture was drained off via the bottom valve into a 20 L container containing acidified isopropanol (3 L, 2.5 wt % of acetic acid). The polymer mixture was filtered and the wet powder was transferred into a 5 L Erlenmeyer flask containing acidified isopropanol (1.0 L, 2.5 wt %) of acetic acid) and stirred (150 RPM) for at least 30 minutes. Subsequently, the mixture was filtered (2 μm pore size qualitative filter paper), washed with demineralized water, sprayed with Irganox 1010 (antioxidant) and dried for 48 hours under vacuum at 80° C. using a vacuum oven.

Typical Preparation Procedure of poly(propylene-co-1-hexene-co-10-undecen-1-ol)-graft-SMA Poly(propylene-co-1-hexene-co-10-undecen-1-ol) ($M_n$=76.9 kg·mol$^{-1}$, Đ=2.2, $T_m$=143.4° C., $\Delta H_m$=95.4 J·g$^{-1}$, FG/chain=5.7; 50 g) was placed in a 2 L glass reactor with a magnetic stirrer and dried by Dean-Stark distillation in toluene (1500 mL) for 24 hours. In the next step, the solution was cooled down to 80° C. and catalyst-titanium (IV) isopropoxide (0.25 mL, 0.24 g, 0.8 mmol) was added. The reaction was carried out for 1 hour under nitrogen atmosphere. Then styrene-maleic anhydride (SMA) random copolymer ($M_n$=36.3 kg·mol$^-$, $T_g$=150° C.) (12.5 g) was added and the reaction was carried out for 24 hours under nitrogen atmosphere. The synthesized poly(propylene-co-1-hexene-co-10-undecen-1-ol)-graft-SMA graft copolymer was isolated by the precipitation in cold methanol, then filtered and dried in a vacuum oven at 40° C. for 24 hours. The product was not soluble in o-DCB, $T_m$=140.2° C., $\Delta H_m$=78.9 J·g$^{-1}$.

Typical Preparation Procedure of Poly(propylene-co-1-hexene-co-10-undecen-1-ol)-graft-SMA Via Reactive Extrusion Process Poly(propylene-co-1-hexene-co-10-undecen-1-ol) ($M_n$=72.1 kg/mol, Đ=2.3, $T_m$=148.0° C., $\Delta H_m$=108.4 J·g$^{-1}$, FG/chain=1.4; 50 g) was dissolved in toluene (500 mL) and premixed with catalyst titanium (IV) isopropoxide (0.25 mL, 0.24 g, 0.8 mmol). The product was precipitated in cold methanol and dried. The titanium-treated poly(propylene-co-1-hexene-co-10-undecen-1-ol) and SMA ($M_n$=36.3 kg/mol, $T_g$=150° C.) (24.1 g) were fed in an extruder at 210-230° C. with a screw rotation speed of 40 rpm under nitrogen atmosphere. The mixture was processed, and then cooled and granulated.

Typical Preparation Procedure of Isotactic poly(propylene-co-ethylene-co-10-undecen-1-ol)

The polymerization reaction was carried out in a stainless steel 2 L BÜCHI reactor. Prior to the polymerization, the reactor was hot washed with 1.5 L heptane in 100° C. for one hour. After dumping, 1 L of heptane was added into reactor and heated up to 80° C. In the glovebox, a predefined amount of 10-undecene-1-ol was introduced into the vial and injected into the reactor. Next, the reactor was vented to 1 bar of nitrogen pressure while being stirred with 300 rpm. After venting, the mixture was saturated with propylene to 5 bar of propylene partial pressure. In the glove box, rac-Me$_2$Si(2-Me-4-Ph-Ind)$_2$ZrCl$_2$ catalyst (around 3 mg) was dissolved in corresponding toluene solution containing TIBA (5 mL TiBA in 300 mL toluene), volume (ca. 3 mL). Then a specified amount of precatalyst solution (usually 0.3 mL) was further dissolved with around 5 mL of a TiBA solution in toluene. A solution of a specified concentration of DEZ in around 5 mL of toluene was prepared. The precatalyst was activated by adding a suitable amount of MAO/MMAO and was transferred into the reactor. Subsequently, the DEZ solution was added. The reactor was then operating in flow control mode, wherein the mixture of propylene and ethylene (5:1 ratio) was dosed by a stable flow to maintain a pressure of 5 bar. The temperature was kept stable at 80° C. After a set time, the monomer feed was stopped and reactor was vented to 1 bar and the mixture was dumped into an Erlenmeyer flask. After dumping, the post-reaction mixture was quenched with 0.1 L of acidified isopropanol (10 wt % of acetic acid, 0.1 L of isopropanol). The mixture was cooled to room temperature and filtrated through a 5-13 μm paper filter. The resulting white powder was then washed with heptane and dried under reduced pressure in a vacuum oven at 80° C. for 48 hours. For the polymer characterization see Table 1.

Typical Preparation Procedure of poly(propylene-co-ethylene-co-10-undecen-1-ol)-graft-SMA Poly(propylene-co-ethylene-co-10-undecen-1-ol) ($M_n$=45.2 kg·mol$^{-1}$, Đ=2.3, $T_m$=135.3° C., $\Delta H_m$=96.7 J·g$^{-1}$, FG/chain=1; 50 g) was placed in a 2 L glass reactor with a magnetic stirrer and dried by Dean-Stark distillation in toluene (1500 mL) for 24 hours. In the next step, the solution was cooled to 80° C. and catalyst titanium (IV) isopropoxide (0.25 mL, 0.24 g, 0.8 mmol) was added. The mixing was carried out for 1 hour under nitrogen atmosphere. Then styrene-maleic anhydride (SMA) random copolymer ($M_n$=36.3 kg·mol$^{-1}$, $T_g$=150° C.) (12.5 g) was added. The synthesized graft copolymer was isolated by the precipitation in cold methanol then filtrated and dried in a vacuum oven at 40° C. for 24 h. The product was not soluble in o-DCB, therefore it could not be analyzed by SEC, $T_m$=152.2° C., $\Delta H_m$=36.7 J·g$^{-1}$.

TABLE 1

Molecular characterization and thermal properties of the iPP, PO-based copolymers and PO-graft-SMA graft copolymers.

| Entry | Sample name | $M_n$ [kg/mol] | Đ [-] | $T_m$ [° C.] | $\Delta H_m$ [J/g] | $T_c$ [° C.] | χ [%] | OH/chain |
|---|---|---|---|---|---|---|---|---|
| 1 | Polypropylene homopolymer 500P | 52.9 | 8.0 | 158.9 | 104.9 | 100.3 | 50.7 | — |
| 2 | Polypropylene homopolymer 520P | 46.9 | 5.8 | 159.3 | 115.6 | 111.2 | 55.9 | — |
| 3 | Polypropylene homopolymer 531PH | 144.7 | 4.7 | 160.4 | 104.8 | 108.8 | 50.6 | — |
| 4 | Polypropylene homopolymer 575P | 39.4 | 7.2 | 153.4 | 113.1 | 112.6 | 54.6 | — |
| 5 | iPP-graft-OH | 26.9 | 4.0 | 153.4 | 110.0 | 111.2 | 53.1 | 1.0 |
| 6 | iPP-graft-SMA (9 wt %) | NS | NS | 154.2 | 96.8 | 112.3 | 46.7 | —*** |
| 7 | iPP-graft-SMA (11 wt %) | NS | NS | 153.9 | 88.4 | 112.0 | 42.7 | —*** |
| 8 | iPP-graft-SMA (14 wt %) | NS | NS | 154.5 | 104.8 | 112.2 | 50.6 | —*** |
| 9 | POE-graft-OH | NS | NS | 63.3 | 28.8 | 37.9 | | 1.0 |
| 10 | POE-graft-SMA (11 wt %) | 21.1 | 4.6 | 109.1 | 74.7 | 92.1 | 91.4 | —*** |
| 11 | Poly(propylene-co-1-hexene-co-10-undecen-1-ol) | 72.1 | 2.3 | 148.0 | 148.0 | 108.4 | 52.4 | 1.4 |
| 12 | Poly(propylene-co-1-hexene-co-10-undecen-1-ol) $^a$ | 75.1 | 2.2 | 146.3 | 104.4 | 119.8 | 50.4 | 2.5 |
| 13 | Poly(propylene-co-1-hexene-co-10-undecen-1-ol)-graft-SMA (20 wt %) (SOL) | NS | NS | 148.5 | 102.0 | 112.5 | 49.3 | —*** |
| 14 | Poly(propylene-co-1-hexene-co-10-undecen-1-ol)-graft-SMA (25 wt %) (SOL) | NS | NS | 141.3 | 85.4 | 103.1 | 41.2 | —*** |
| 15 | Poly(propylene-co-1-hexene-co-10-undecen-1-ol)-graft-SMA (30 wt %) (SOL) | NS | NS | 143.8 | 63.5 | 100.5 | 30.4 | —*** |
| 16 | Poly(propylene-co-1-hexene-co-10-undecen-1-ol)-graft-SMA (35 wt %) (SOL) | 50.8 | 6.1 | 145.6 | 51.5 | 101.4 | 50.2 | —*** |
| 17 | Poly(propylene-co-1-hexylene-co-10-undecen-1-ol)-graft-SMA (30 wt %) (reactive extrusion) | 66.3 | 2.6 | 144.5 | 59.8 | 111.6 | 58.7 | —*** |
| 18 | Poly(propylene-co-1-hexene-co-10-undecen-1-ol)-graft-SMA (35 wt %) (reactive extrusion) | 70.9 | 2.7 | 146.0 | 80.3 | 116.6 | 80.2 | —*** |

TABLE 1-continued

Molecular characterization and thermal properties of the iPP, PO-based copolymers and PO-graft-SMA graft copolymers.

| Entry | Sample name | $M_n$ [kg/mol] | Đ [-] | $T_m$ [° C.] | $\Delta H_m$ [J/g] | $T_c$ [° C.] | χ [%] | OH/chain |
|---|---|---|---|---|---|---|---|---|
| 19 | Poly(propylene-co-ethylene-co-10-undecen-1-ol) | 45.2 | 2.3 | 135.3 | 96.7 | 96.8 | 46.7 | 1.0 |
| 20 | Poly(propylene-co-ethylene-co-10-undecen-1-ol)-graft-SMA (20 wt %) | 15.8 | 2.4 | 152.2 | 36.7 | 87.2 | 17.7 | —*** |

NS—non soluble in o-dichlorobenzene (o-DCB)
***—all of the functional —OH groups reacted
$^a$ FPO used for the preparation of entry 13, 14, 15, 16 in a solution (SOL)

Typical Procedure for Bitumen Modification

The modification of bitumen was carried out at 180° C. using Ultra-Turrax T50 basic homogenizer (IKA Company) working at the speed range 4000-6000 rpm. Usually the hot bitumen was mixed with the modifier for 60 minutes.

Typical Procedure for Softening Point Analysis

Softening point tests were performed with Ring&Ball apparatus according to European Standard 1427. In this method two metal rings filled with asphalt are heated at a controlled rate 5° C./min in a water bath while each supports a steel ball. The softening point temperature is determined as a temperature at which steel balls coated with asphalt fall through a height of 25 mm. The reported softening point value is the average of the temperatures determined for each ball.

Typical Procedure for Penetration Analysis

Penetration tests were performed according to European Standard 1426. In this method, a needle with specified dimension and weight is penetrating the asphalt sample, under a 100 g load for 5 seconds at 25° C. The penetration value is expressed in decimillimetres as a vertical distance penetrated by needle into asphalt. The penetration value is the average from three individual measurements.

Typical Procedure for Hot Storage Stability Analysis

Hot storage stability tests were performed according to the European Standard 13399. In this method, two sealed aluminum tubes filled with asphalt are vertically placed in the oven at 180° C. for 72 h. In the next step, the tubes with asphalt are cooled down and frozen. Then the aluminum cover is removed and asphalt and bitumen are divided into 3 sections: top, middle and bottom, respectively. Then the top and bottom sections are molten separately and used for penetration and softening point analysis.

Optical and Fluorescence Microscopy

Optical and fluorescence imaging was directly performed on the bitumen sample prepared for AFM analysis without further treatment at ambient conditions with 20× magnification. For fluorescence microscopy imaging, the exposure time of 300 ms was used.

AFM Analysis

For AFM analysis, around 50 mg bitumen samples were first deposited on a microscope glass slide. Then the samples were heated on a hot plate of 100° C. for a few seconds in order to create a thin flat film with thickness of around 100 μm. Then the samples were cooled to room temperature under ambient conditions and kept for at least one day before the AFM analysis was performed. AFM imaging was directly performed on the layer surface at ambient conditions without further treatment of the sample. AFM imaging was performed at Dimension FastScan AFM system from Bruker utilizing tapping mode AFM tips (Model TESPA-V2, k: 42 N/m, f: 320 kHz) with a scan frequency of 1 Hz. Software Nanoscope 9.4 from Bruker was used as computer interface for operation and Nanoscope Analysis 2.0 from Bruker was used for the analysis of AFM measurements. All AFM measurements were performed at ambient conditions.

AFM HA-QNM Experimental

Samples were also characterized by HA-QNM mode with a frequency of 0.5 Hz using an AFM tip with a spring constant of 5 N/m (TAP-150-30, No. 3 k=5 N/m) at ambient conditions. With this special tip all the information of the tip needed for the QNM mode can be transferred immediately to the AFM operation program by a click with a bar-reader. Therefore, no calibration steps for spring constant and tip radius are needed before real measurements. QNM mode enables the quantitative measurements of nano-scale material mechanical properties by performing pixelwise force curves in the scanned area. Analysis of the individual force curve data by the AFM Nano-scope software provides a map of material properties with the same resolution of topography image. Here the elastic modulus of the scanned surface was extracted from the force curve using the Derjaguin-Muller-Toropov model and presented in the modulus mapping images.

Dynamic Shear Rheometry (DSR) Analysis

Rheological tests (DSR analysis) were performed using the Discovery Hybrid Rheometer HR-3 (TA Instruments) in oscillatory shear mode. Before the test, each sample was conditioned at 20° C. for at least 20 minutes. Temperature sweep tests in oscillatory shear were conducted at a frequency of 10 rad/s, at strain 1%, using plate geometry with 25 mm diameter and a gap size of 1 mm and in the temperature range of 20-120° C. As a result of DSR tests obtained rheological indices were the dynamic shear modulus (G', G", G*), phase angle (δ), and loss tangent (tan δ) as well as the rutting factor (G*/sin δ), which was used to evaluate the anti-rutting ability of modified bitumen.

Viscosity Test at 180° C.

The dynamic viscosity of the obtained PMB was determined using a TermoElectron—Haake Viscotester 2 Plus viscometer in accordance with EN 13302 standard. The measurement was performed at 180° C., by immersing the appropriate measuring head of the viscometer in the PMB to the depth determined by the scale placed above the test cylinder. Then dynamic viscosity value [dPa·s] was read from the digital display of the apparatus.

Avg. Softening Point

The test was carried out in accordance with PN-EN 1427 standard. Immediately upon the homogenization was completed, the hot sample of PMB was poured into two brass rings placed on a metal plate with drilled, round holes. Pate was previously lubricated with an anti-adhesive agent (silicon). After minimum 30 minutes, excess of modified bitumen was removed with a hot blade, so that the cut surface was in line with the top edge of the each ring. The next step was to place the rings on a rack, and hanging it vertically inside a standardized beaker designed specifically for this test (V=600 mL). Then the beaker, depending on the expected softening point of the PMB, was poured with distilled water or glycerol to the level marked by a line in the upper part of the vessel. The samples in the baths were then cooled down for minimum 15 minutes at the temperature of 5±1° C. in a refrigerator. Next, the beaker was placed on a heating element of the R&B measuring apparatus (Petrotest R&B tester). A thermometer and stirrer were placed in the beaker to ensure even distribution of the supplied heat in the entire volume of the liquid. The last step was to place two steel balls (mass of each=3.5 g) in the holes of the rack located directly above the rings, and heating the system at a constant rate of 5° C./min. The temperature was read from the thermometer when a given ball reached the bottom of the beaker (the height from the ring to this point is 25 mm). The result for a given sample was the average temperature of the reading for a pair of rings filled with the same PMB sample.

Avg. Penetration and Softening Point After Ageing

The resistance to thermos-oxidative aging of the obtained PMB samples was determined by the Rolling Thin Film Oven Test (RTFOT) in accordance with the PN-EN 12607-1 standard. This test is carried out in a furnace equipped with a circular carnage with eight openings into which glass containers with the PMB sample are placed. The glass containers used in this test shall be cylindrical in shape with a diameter of 64 mm, a height of 140 mm and a wall thickness of not more than 2.3 mm. To determine the aging resistance of a single binder, two containers (hereinafter A and B) were filled with one type of bitumen sample. Thus, four different binders could be tested in a single test. The first step was to weigh the empty containers to obtain the masses mA0 i mB0. Then, the weighed containers were filled with the tested polymer bitumen sample in the amount of 35.0±0.5 g, and their masses mA1 i mB1 were determined again using analytical balance. The so-prepared samples were then placed in an oven preheated to the temperature of 163° C., and started to rotate at a speed of 15 rpm. During the test, the air flow rate through the furnace chamber was set at 4 L/min according to the standard. The test time was 75 minutes, counted from the moment when the temperature reached again 163° C. After this time, the samples were removed from the oven and allowed to cool down to the room temperature. Samples after ageing were then weighed to obtain the masses mA2 i mB2. All mass measurements of the samples were made with an accuracy of 1 mg. The weighted masses for both containers in each test stage were averaged to obtain the masses m0, m1 and m2. These values were then substituted in the formula contained in the standard, resulting in the percentage change in the mass of the sample, which was one of the measures of the resistance to aging of the polymer modified bitumen. Finally, the average remaining penetration % at 25° C. and the softening point of the residual polymer bitumen after the RTFOT test were measured in accordance with the PN-EN 12607-1 standard as regards of values of these parameters obtained for PMB samples before RTFOT test.

$^1$H NMR Spectroscopy for Determination of Hydroxyl Functionality Level

The mol % of functionalization was determined by $^1$H NMR analysis carried out at 130° C. using deuterated tetrachloroethane (TCE-D2) as solvent and recorded in 5 mm tubes on a Varian Mercury spectrometer operating at a frequency of 400 MHz. Chemical shifts are reported in ppm versus tetramethylsilane and were determined by reference to the residual solvent protons.

In this application, hydroxyl functionality level includes the quantity of OH group within the polymer, but also of the quantity of OH group which has been reacted with SMA and are no longer present in the reaction product.

Results

Figure 1A:
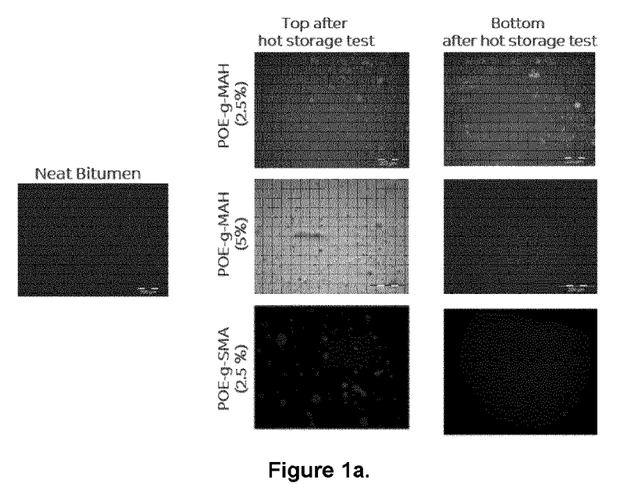
FIGS. 1a and 1b illustrates fluorescence images of a neat bitumen and selected polymer modified bitumen samples recorded after the hot storage stability test.
Figure 1B:
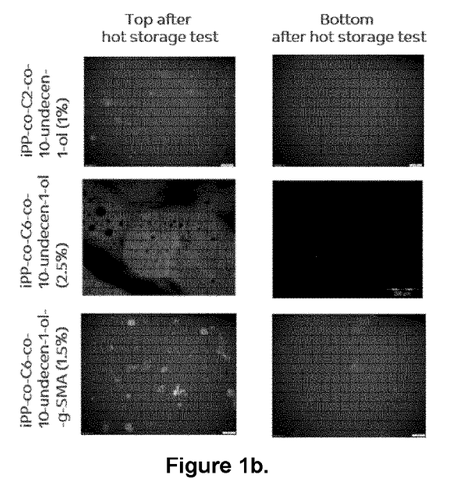

FIG. 1 illustrates an embodiment according to fluorescence images of the neat bitumen (Lotos S.A., grade 70/100) and its comparison with the selected polymer modified bitumen samples viz. POE-graft-MAH, POE-graft-SMA (Table 1, entry 10), poly(propylene-co-ethylene-co-10-undecen-1-ol) (Table 1, entry 19), poly(propylene-co-1-hexene-co-10-undecen-1-ol) (Table 1, entry 12) and poly(propylene-co-1-hexene-co-10-undecen-1-ol)-graft-SMA (30 wt %) (Table 1, entry 15). The fluorescence image of the neat bitumen reveals a homogeneous structure without any fluorescence particles present at the surface of the sample. The incorporation of the modifiers into the bitumen affects the morphology significantly since several fluorescent agglomerates can be visualized. The polymer-based modifier swells in the bitumen and most likely attracts aromatic units present in the bitumen. Therefore the dispersion of the bitumen modifier can be easily analyzed using fluorescence microscopy. As presented in FIG. 1 the incorporation of POE-graft-MAH up to around 2.5 wt %, as a bitumen modifier, results in a uniform distribution of the polymer in the bitumen matrix. Further increase of the POE-graft-MAH content in the bitumen leads to a significant phase separation of the polymer from the matrix. Upon copolymerization of POE with SMA, the uniform morphology of the bitumen samples can be observed again. Similar results can be observed for the products modified using poly(propylene-co-ethylene-co-10-undecen-1-ol) and poly(propylene-co-1-hexene-co-10-undecen-1-ol)-graft-SMA.

Figure 2A:
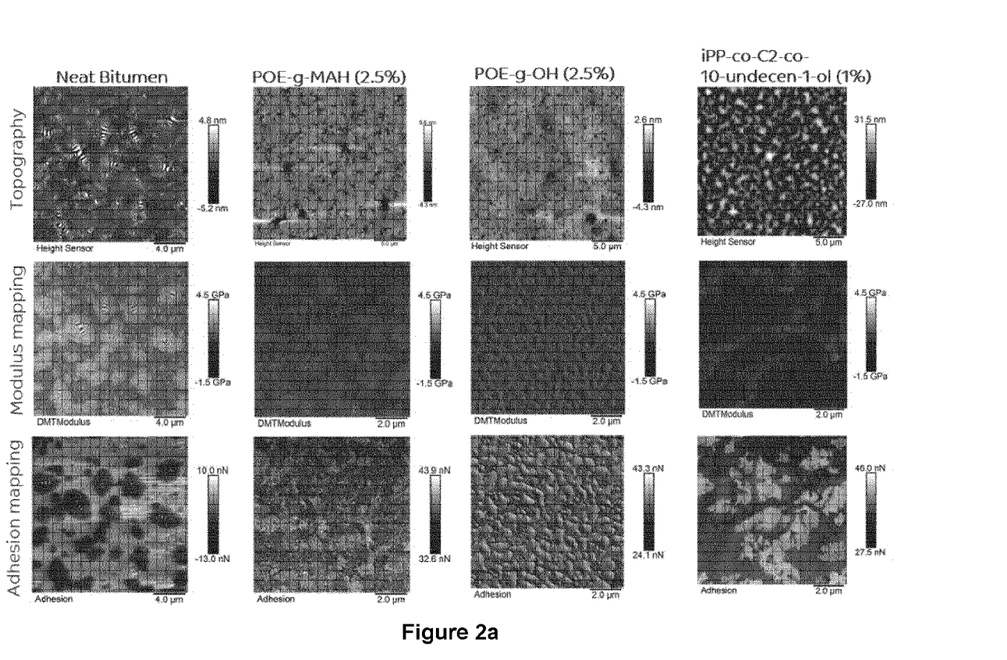
FIGS. 2a and 2b illustrates surface morphology and mechanical properties analysis of neat bitumen and polymer modified bitumen samples recorded after a hot storage stability test.
Figure 2B:
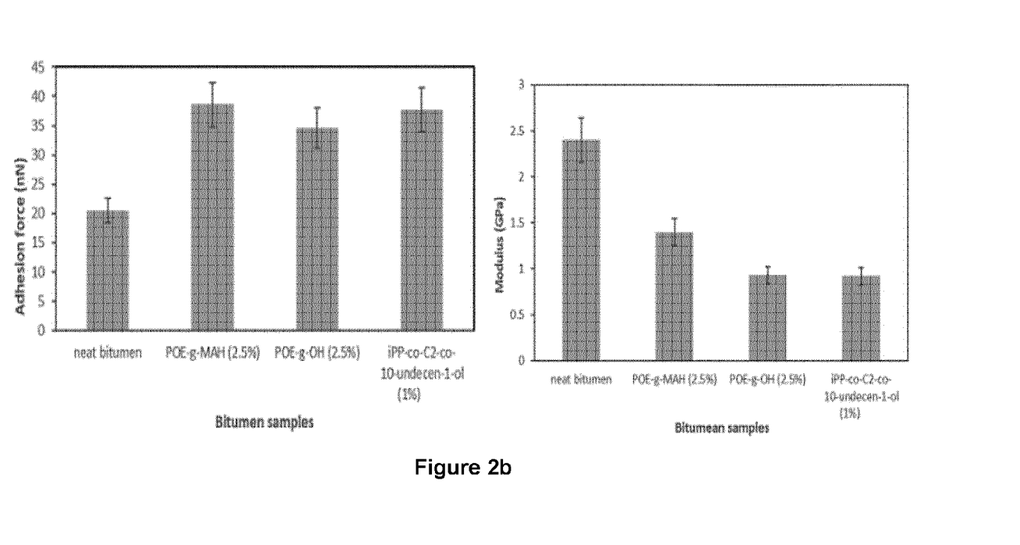

FIG. 2 presents surface morphologies and mechanical properties investigation by HA-QNM experiments. The AFM topography image of a neat bitumen reveals significant phase separation of the bitumen components and the presence of "bee" structures homogeneously dispersed over the sample surface. The occurrence of such "bee" microstructures is believed to be the result of the binder's chemistry and various external factors such as temperature history, sample preparation, annealing/resting time. It has also been reported that these structures are related to the presence of asphaltenes—the most polar fraction in bitumen. Another hypothesis is that "bee" structures are composed of non-polar crystalline paraffin waxes (linear n-alkanes) and sometimes lack of "bee" structure in the bitumen may be related to the association of waxes with other bitumen fractions. As presented in FIG. 2 the incorporation of POE-graft-MAH, POE-graft-OH or poly(propylene-co-ethylene-co-10-undecen-1-ol) into bitumen results in disappearance of the heterogeneous "bee" microstructures and leads to an improved morphology of the bitumen surface. The AFM HA-QNM experiments show that the incorporation of functional polyolefins decreases the modulus of the materials and enhances the adhesion force between the tip and the surface of the bitumen. This clearly indicates that the surface is more elastic and reveals higher wettability when compared with a neat bitumen.

Figure 3:
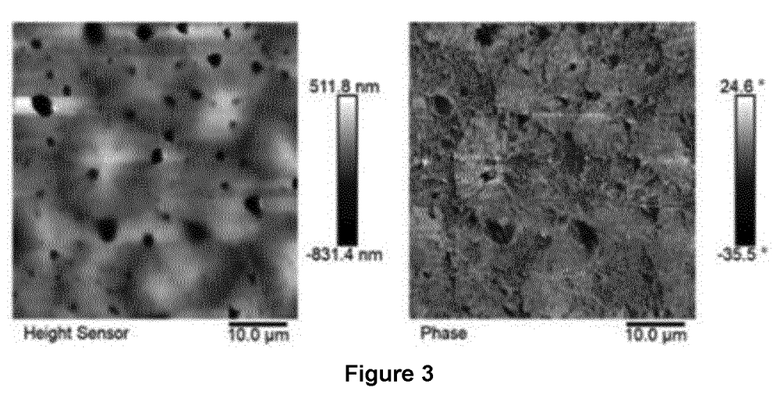
FIG. 3 illustrates AFM images of bitumen sample modified by poly(propylene-co-1-hexylene-co-10-undecen-1-ol) (amount of used modifier equal to 2.5 wt %) (Table 2, entry 12) recorded after a hot storage stability test (top part).
Figure 4:
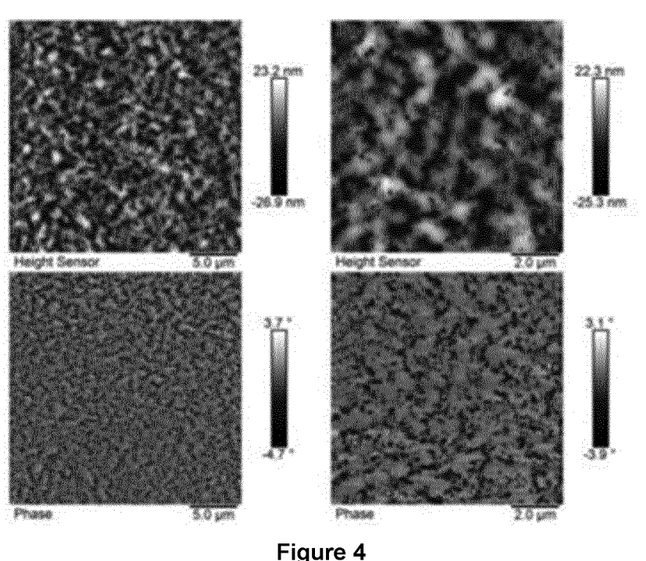
FIG. 4 illustrates AFM images of bitumen sample modified by poly(propylene-co-1-hexylene-co-10-undecen-1-ol)-graft-SMA (amount of used modifier equal to 1.5 wt %) (Table 2, entry 15) recorded after a hot storage stability test (top part).

FIGS. 3 and 4 illustrate the AFM images of the bitumen modified using poly(propylene-co-1-hexene-co-10-undecen-1-ol) and poly(propylene-co-1-hexene-co-10-undecen-1-ol)-graft-SMA, respectively. The AFM images clearly show lack of any heterogeneous "bee" microstructures in the polymer modified bitumen, an improved morphology and enhanced compatibility between the compositions ingredients.

Figure 5:
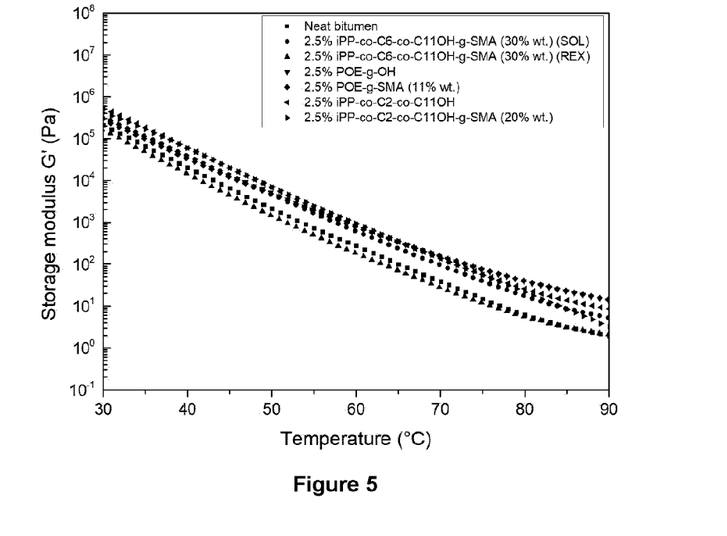
FIG. 5 illustrates rheology measurement of neat and polymer modified bitumen—Storage modulus (G').

FIGS. 5-10 present DSR results. FIG. 5 shows storage modulus changes versus the temperature of a neat bitumen and polymer-modified bitumen samples. Most of presented polymer-modified bitumen samples show improved elasticity compared to neat bitumen. Only the incorporation of poly(propylene-co-5-hexen-1-ol)-graft-SMA obtained by reactive extrusion (content of SMA in the graft copolymer is equal to 30 wt %) as bitumen modifier did not improve the elasticity of the final product in comparison with a neat bitumen.

Figure 6:
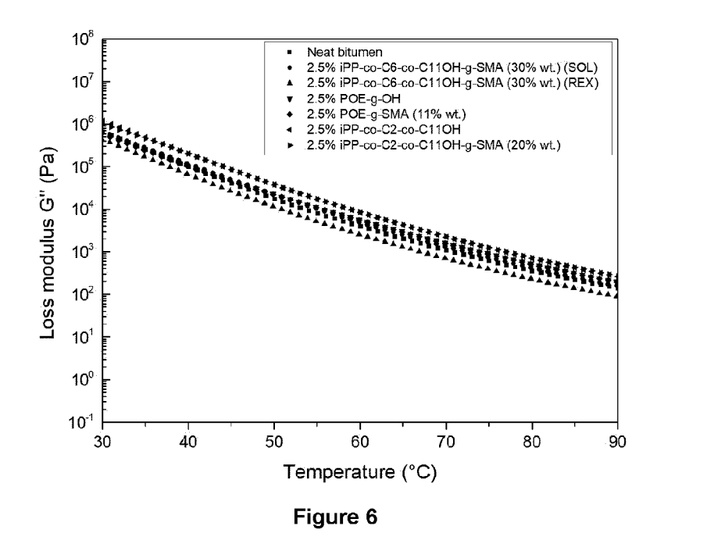
FIG. 6 illustrates rheology measurement of neat and polymer modified bitumen—Loss modulus (G").
Figure 7:
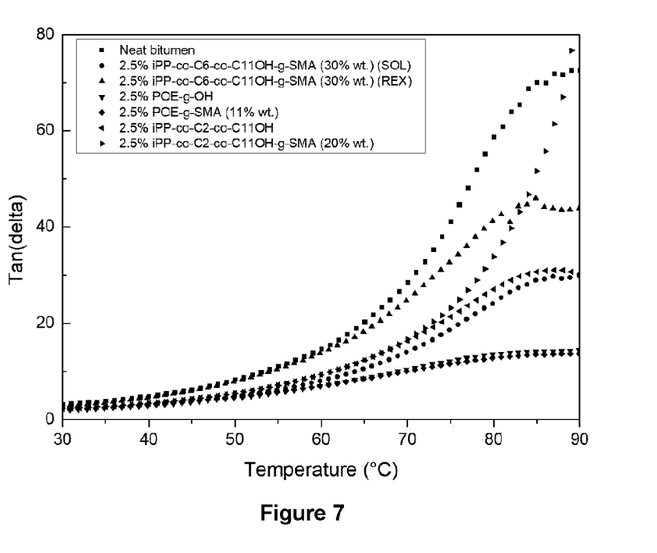
FIG. 7 illustrates rheology measurement of neat and polymer modified bitumen—Loss factor (tan[delta]).

FIG. 6 shows loss modulus changes versus the temperature. The applied polymer-modified bitumen reveal similar performance to a neat bitumen, which means that the plastic character of the bitumen has not changed. FIG. 7 presents the relationship between loss factor (tan [delta]) and temperature of the investigated compositions. The value should be as close to 0 as possible until around 80-90° C. For all of the presented modifiers a significant improvement of loss factor parameter can be observed. The best results were obtained for polymer-modified bitumen samples using POE-graft-OH and POE-graft-SMA (content of SMA in the graft copolymer is equal to 11 wt %).

Figure 8:
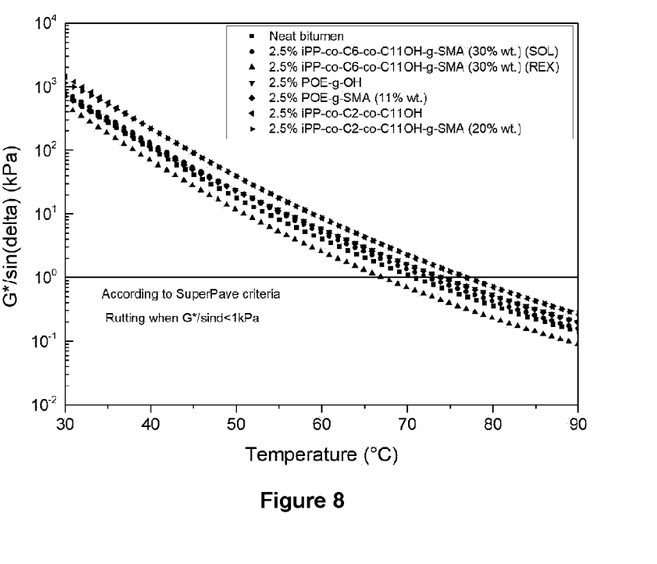
FIG. 8 illustrates rheology measurement of neat and polymer modified bitumen—rutting parameter (G*/sin [delta]).

FIG. 8 exhibits rutting parameter (G*/sin [delta]) versus temperature data. According to SuperPave criteria, rutting occurs when this parameter is lower than 1 kPa. Most of the presented modifiers improve the properties of bitumen. Only the incorporation of poly(propylene-co-5-hexen-1-ol)-graft-SMA obtained by reactive extrusion (content of SMA in the graft copolymer is equal to 30 wt %) as bitumen modifier did not improve rutting resistance of the bitumen. The best results were obtained for polymer-modified bitumen using poly(propylene-co-ethylene-co-10-undecen-1-ol) and its graft copolymer with SMA, which gave around 8° C. improvement in rutting temperature of the modified bitumen.

Figure 9:
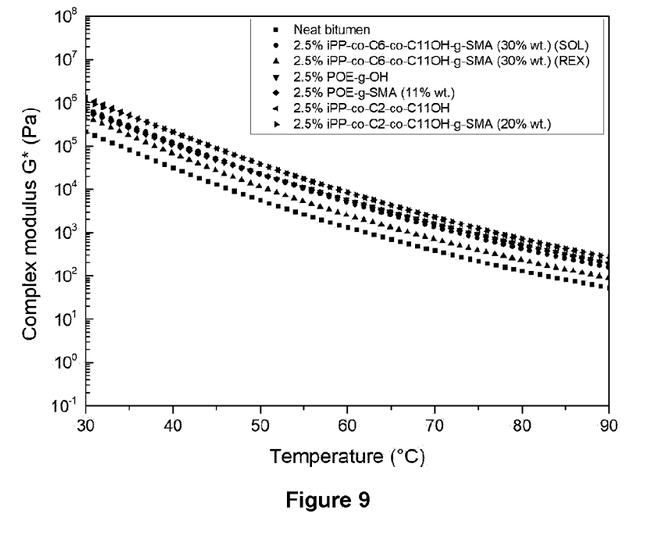
FIG. 9 illustrates rheology measurement of neat and polymer modified bitumen—Complex modulus (G*).

FIG. 9 presents complex modulus of polymer-modified bitumen samples versus temperature data. All of used bitumen modifiers provide improvement in this parameter, which indicates a better resistance to permanent damages of the pavements.

Figure 10:
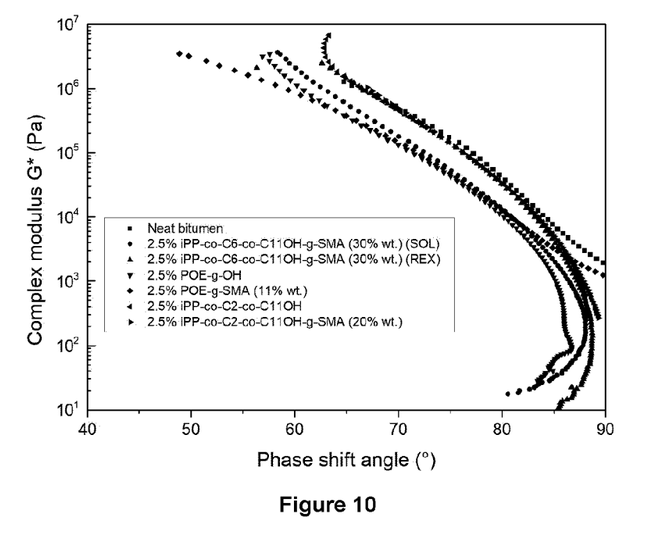
FIG. 10 illustrates rheology measurement of neat and polymer modified bitumen—Black diagram.

FIG. 10 presents a "Black diagram" (complex modulus vs phase shift angle), similar to van Grup-Palmen plot. The inflection of the curves indicates that some structural or morphological changes in the modified bitumen occurred during the measurement. These changes are related to an increasing temperature—the higher temperature the lower complex modulus of the samples is observed. FIG. 10 shows that at regions of low modulus, which corresponds to high temperatures, all of the modified bitumen samples are more elastic, as they reveal lower phase angle, compared to the neat bitumen. The best rheological properties among presented modifiers reveals poly(propylene-co-1-hexene-co-10-undecen-1-ol)-graft-SMA prepared in the reactor via solution process (content of SMA in the graft copolymer is equal to 30 wt %), poly(propylene-co-ethylene-co-10-undecen-1-ol) and POE-graft-OH.

TABLE 2

Properties of a neat bitumen and Polymer Modified Bitumen (polymer-modified bitumen) samples

| Entry | Type of modifier | Modifier [wt %] | Bitumen [wt %] | Viscosity at 180° C. [Pas] | Avg. Penetration [0.1 mm] | Avg. Softening point [° C.] | Penetration [0.1 mm] | | | Softening point [° C.] | | |
|---|---|---|---|---|---|---|---|---|---|---|---|---|
| | | | | | | | Avg. Top | Avg. Bottom | Δ Penetration | Avg. Top | Avg. Bottom | Δ Softening point |
| CE1 | Neat bitumen LOTOS | 0% | 100% | 0.04 | 74 | 45.7 | 80 | 81 | 1 | 46.8 | 46.9 | 0.1 |
| CE2 | Neat bitumen ORLEN | 0% | 100% | 0.03 | 83 | 47.8 | 88 | 89 | 1 | 48.4 | 48.3 | 0.1 |
| 1 | PP 500P | 2.50% | 97.50% | 0.10 | 41 | 54.1 | 17 | 51 | 34 | >140 | 51.6 | >88.4 |
| | | 5.00% | 95.00% | 0.10 | 30 | 58.1 | 29 | 45 | 16 | >140 | 52.8 | >87.2 |
| 2 | PP 520P | 2.50% | 97.50% | 0.08 | 56 | 51.2 | 20 | 41 | 21 | >140 | 61.5 | >78.5 |
| | | 5.00% | 95.00% | 0.10 | 46 | 54.9 | 17 | 45 | 28 | >140 | 50.3 | >89.7 |
| 3 | PP 531P | 2.50% | 97.50% | 0.10 | 42 | 50.2 | 47 | 48 | 1 | >140 | 50.0 | >90.0 |
| | | 5.00% | 95.00% | 0.30 | 22 | 52.1 | 31 | 57 | 26 | >140 | 51.1 | >89.9 |
| 4 | PP 575PH | 2.50% | 97.50% | 0.06 | 55 | 51.5 | 21 | 54 | 33 | >140 | 50.5 | >90.5 |
| | | 5.00% | 95.00% | 0.10 | 42 | 54.3 | 18 | 44 | 26 | >140 | 52.4 | >87.6 |
| 5 | iPP-graft-OH | 2.50% | 97.50% | 0.04 | 57 | 50.2 | 63 | 59 | 4 | 64.5 | 52.4 | 12.1 |
| | | 5.00% | 95.00% | 0.10 | 45 | 56.0 | 30 | 41 | 11 | 147.3 | 54.2 | 93.2 |
| | | 6.30% | 93.70% | 0.14 | 38 | 60.1 | 23 | 36 | 13 | 149.8 | 55.6 | 94.2 |
| 6 | iPP-graft-SMA (9 wt %) | 2.50% | 97.50% | 0.05 | 51 | 51.1 | 56 | 48 | 9 | 60.3 | 51.2 | 9.1 |
| | | 5.00% | 95.00% | 0.06 | 48 | 49.0 | 23 | 48 | 24 | 65.6 | 54.3 | 11.3 |
| 7 | iPP-graft-SMA (11 wt %) | 2.50% | 97.50% | 0.04 | 59 | 50.3 | 61 | 50 | 10 | 60.3 | 52.2 | 8.1 |
| | | 5.00% | 95.00% | 0.06 | 60 | 52.0 | 69 | 69 | 0 | 50.1 | 85.8 | 35.7 |
| 8 | iPP-graft-SMA (14 wt %) | 2.50% | 97.50% | 0.04 | 62 | 52.5 | 67 | 64 | 3 | 59.0 | 51.6 | 7.4 |
| | | 5.00% | 95.00% | 0.07 | 55 | 51.0 | 45 | 64 | 19 | 86.1 | 50.7 | 35.4 |
| 9 | POE-graft-OH | 1.00% | 99.00% | 0.06 | 81 | 47.9 | 72 | 75 | 3 | 50.0 | 47.2 | 2.8 |
| | | 2.50% | 97.50% | 0.07 | 69 | 49.5 | 52 | 58 | 6 | 53.3 | 50.8 | 2.5 |
| | | 5.00% | 95.00% | 0.20 | 47 | 63.8 | 51 | 48 | 2 | 111.2 | 63.9 | 47.3 |
| | | 6.30% | 93.70% | 0.31 | 39 | 65.7 | 41 | 43 | 2 | 121.3 | 68.0 | 53.3 |
| 10 | POE-graft-SMA (11 wt %) | 1.00% | 99.00% | 0.05 | 76 | 47.8 | 81 | 81 | 0 | 51.2 | 46.9 | 4.3 |
| | | 2.50% | 97.50% | 0.06 | 63 | 50.6 | 59 | 59 | 0 | 50.7 | 50.8 | 0.1 |
| | | 5.00% | 95.00% | 0.10 | 50 | 55.6 | 39 | 34 | 5 | >80 | 55.4 | >24.6 |
| 11 | Poly(propylene-co-1-hexene-co-10-undecen-1-ol) | 1.00% | 99.00% | 0.04 | 75 | 46.8 | 81 | 77 | 4 | 47.7 | 46.6 | 1.1 |
| | | 2.50% | 97.50% | 0.07 | 64 | 50.6 | 58 | 69 | 10 | 68.3 | 50.2 | 18.3 |
| | | 5.00% | 95.00% | 0.06 | 55 | 51.8 | 49 | 38 | 11 | >100 | 52.1 | >47.9 |
| | | 6.30% | 93.70% | 0.06 | 49 | 52.6 | 42 | 30 | 12 | >100 | 53.2 | >46.8 |

TABLE 2-continued

Properties of a neat bitumen and Polymer Modified Bitumen (polymer-modified bitumen) samples

| Entry | Type of modifier | Modifier [wt %] | Bitumen [wt %] | Viscosity at 180° C. [Pas] | Avg. Penetration [0.1 mm] | Avg. Softening point [° C.] | Penetration [0.1 mm] | | | Softening point [° C.] | | |
|---|---|---|---|---|---|---|---|---|---|---|---|---|
| | | | | | | | Avg. Top | Avg. Bottom | Δ Penetration | Avg. Top | Avg. Bottom | Δ Softening point |
| 12 | Poly(propylene-co-1-hexene-co-10-undecen-1-ol) | 2.50% | 97.50% | 0.08 | 61 | 50.8 | 56 | 55 | 1 | 57.4 | 51.6 | 5.8 |
| | | 5.00% | 95.00% | 0.11 | 48 | 53.6 | 45 | 43 | 2 | 61.1 | 54.2 | 6.9 |
| | | 6.30% | 93.70% | 0.13 | 40 | 54.9 | 34 | 30 | 4 | 74.4 | 56.1 | 17.8 |
| 13 | Poly(propylene-co-1-hexene-co-10-undecen-1-ol)-graft-SMA (20 wt %) (SOL) | 1.00% | 99.00% | 0.06 | 85 | 47.5 | 74 | 80 | 6 | 48.2 | 46.6 | 1.6 |
| | | 2.50% | 97.50% | 0.07 | 79 | 48.1 | 45 | 73 | 28 | 52.4 | 47.5 | 4.85 |
| 14 | Poly(propylene-co-1-hexene-co-10-undecen-1-ol)-graft-SMA (25 wt %) (SOL) | 1.00% | 99.00% | 0.05 | 87 | 46.2 | 69 | 77 | 7 | 47.6 | 46.4 | 1.2 |
| | | 2.50% | 97.50% | 0.05 | 84 | 46.8 | 72 | 76 | 4 | 48.6 | 46.7 | 1.9 |
| | | 5.00% | 95.00% | 0.06 | 79 | 48.1 | 34 | 70 | 36 | 51.9 | 47.9 | 4.0 |
| 15 | Poly(propylene-co-1-hexene-co-10-undecen-1-ol)-graft-SMA (30 wt %) (SOL) | 1.00% | 99.00% | 0.05 | 85 | 45.7 | 74 | 77 | 4 | 47.2 | 46.0 | 1.2 |
| | | 1.50% | 98.50% | 0.05 | 83 | 46.8 | 71 | 76 | 5 | 48.4 | 46.6 | 1.9 |
| | | 2.50% | 97.50% | 0.06 | 61 | 51.0 | 52 | 64 | 12 | 52.4 | 48.8 | 3.6 |
| 16 | Poly(propylene-co-1-hexene-co-10-undecen-1-ol)-graft-SMA (35 wt %) (SOL) | 1.50% | 98.50% | 0.05 | 86 | 45.4 | 32 | 65 | 33 | 46.9 | 47.1 | 0.1 |
| | | 2.50% | 97.50% | 0.07 | 69 | 47.6 | 10 | 56 | 46 | 51.2 | 46.4 | 4.8 |
| 17 | Poly(propylene-co-1-hexene-co-10-undecen-1-ol)-graft-SMA (30 wt %) (reactive extrusion) | 1.50% | 98.50% | 0.04 | 85 | 45.8 | 82 | 82 | 0 | 54.9 | 46.6 | 8.3 |
| | | 2.50% | 97.50% | 0.04 | 83 | 46.9 | 30 | 78 | 48 | 54.2 | 46.4 | 7.8 |
| 18 | Poly(propylene-co-1-hexene-co-10-undecen-1-ol)-graft-SMA (35 wt %) (reactive extrusion) | 1.50% | 98.50% | 0.05 | 92 | 45.2 | 82 | 86 | 4 | 47.2 | 45.6 | 1.6 |
| | | 2.50% | 97.50% | 0.06 | 80 | 47.5 | 73 | 73 | 0 | 66.7 | 47.1 | 19.6 |
| 19 | Poly(propylene-co-ethylene-co-10-undecen-1-ol) | 1.00% | 99.00% | 0.06 | 75 | 46.95 | 85 | 80 | 5 | 47.3 | 47.4 | 0.1 |
| | | 2.50% | 97.50% | 0.07 | 70 | 49.05 | 36 | 63 | 27 | 68.1 | 50.1 | 18.0 |
| 20 | Poly(propylene-co-ethylene-co-10-undecen-1-ol)-graft-SMA (20 wt %) | 1.00% | 99.00% | 0.06 | 81 | 46.4 | 79 | 75 | 4 | 46.9 | 46.8 | 0.1 |
| | | 2.50% | 97.50% | 0.07 | 74 | 48.2 | 69 | 68 | 1 | 51.6 | 48.4 | 3.2 |
| | | 5.00% | 95.00% | 0.10 | 57 | 52.15 | 31 | 53 | 22 | >100 | 52.5 | >47.5 |

The invention claimed is:
1. A composition comprising:
bitumen; and
a randomly hydroxyl-functionalized polymer or a graft copolymer containing said randomly hydroxyl functionalized polymer and styrene-maleic-anhydride copolymer (PO-graft-SMA), configured to create a thermally reversible cross-linking network within the bitumen wherein the randomly hydroxyl functionalized polymer is selected from the group comprising: hydroxyl functionalized polyolefin thermoplast or hydroxyl functionalized polyolefin elastomer or hydroxyl functionalized polyolefin plastomer.
2. The composition according to claim 1 wherein the amount of hydroxyl functional groups ranges between 1 and 8 per polymer chain and the hydroxyl functionality level is at least 0.05 mol % of the total polymer, measured by [1]HMNR.

3. The composition according to claim 1 wherein the hydroxyl functionalized polymer is present in an amount between 0.5 and 10 wt % based on the weight of the composition.

4. The composition according to claim 1 wherein the hydroxyl functionalized polymer is selected from the group comprising: hydroxyl functionalized-HDPE, -LDPE, -ethylene-copolymers (LLDPE), -PP, or -propylene copolymers.

5. The composition according to claim 1 wherein hydroxyl functionalized elastomer or plastomer is based on an elastomer or plastomer selected from the group comprising: poly(ethylene-co-propylene), poly(ethylene-co-1-butene), poly(ethylene-co-1-hexene), poly(ethylene-co-1-octene), poly(ethylene-co-norbornene), atactic polypropylene, poly(propylene-co-1-butene), poly(propylene-co-1-hexene), or poly(propylene-co-1-octene).

6. The composition according to claim 1 comprising the PO-graft-SMA, wherein the PO-graft-SMA content is in the range of 1 to 10 wt % based on the weight of the composition, where PO stands for polyolefin thermoplast, plastomer or elastomer.

7. The composition according to claim 6 wherein the PO-graft-SMA is a PP-graft-SMA.

8. The composition according to claim 1 wherein the bitumen is refinery or cracker leftover or re-used pavement material or re-used asphalt.

9. The composition according to claim 1 wherein the composition achieves at least one of the following parameters:
   viscosity at 180° C. [Pas]: <2 Pas, determined using a TermoElectron-Haake Viscotester 2 Plus viscometer in accordance with EN 13302 standard;
   avg. softening point [C]: >45.7 determined in accordance with PN-EN 1427 standard;
   Δ penetration after aging: <10, determined by the Rolling Thin Film Oven Test (RTFOT) in accordance with the PN-EN 12607-1 standard;
   Δ softening point after aging: <10, determined by the Rolling Thin Film Oven Test (RTFOT) in accordance with the PN-EN 12607-1 standard.

10. A composition comprising:
   bitumen; and
   a graft copolymer containing randomly hydroxyl functionalized polyolefin and styrene-maleic-anhydride copolymer (PO-graft-SMA), wherein the amount of PO is between 60 and 95 wt % based on the weight of the PO-graft-SMA, and the amount of SMA is between 5 and 40 wt % based on the weight of the PO-graft-SMA, where the PO is a polyolefinic thermoplast, a polyolefin plastomer (POP) or polyolefin elastomer (POE).

11. A composition comprising:
   bitumen; and
   a graft copolymer containing randomly hydroxyl functionalized polyolefin and styrene-maleic-anhydride copolymer (PO-graft-SMA), wherein the amount of PO is between 60 and 90 wt % based on the weight of the PO-graft-SMA, and amount of SMA is between 10 to 40 wt % based on the weight of the PO-graft-SMA.

12. The composition according to claim 1 wherein the hydroxyl functionalized polymer is present in an amount of about 1 to about 2.5 wt % based on the weight of the composition.

13. The composition according to claim 10 comprising PO-graft-SMA wherein the amount of PO is between 65 and 80 wt % based on the weight of the PO-graft-SMA, and amount of SMA is between 20 to 35 wt % based on the weight of the PO-graft-SMA.

14. The composition according to claim 6 wherein the PO-graft-SMA content is in the range of 1 to 5 wt % based on the weight of the composition.

15. The composition according to claim 6 wherein the PO-graft-SMA content is in the range of 1 to 2.5 wt % based on the weight of the composition.

16. The composition according to claim 10 wherein the amount of SMA is between 10 and 30 wt % based on the weight of the PO-graft-SMA.

17. The composition according to claim 15 wherein the amount of SMA is below 20 wt % based on the weight of the PO-graft-SMA.

18. The composition according to claim 1 comprising the PO-graft-SMA, wherein the amount of SMA is between 10 and below 20 wt % based on the weight of the PO-graft-SMA.

19. The composition according to claim 11 wherein the amount of SMA is between 10 and below 20 wt % based on the weight of the PO-graft-SMA.

20. The composition according to claim 1 wherein the hydroxyl functionalized polymer comprises poly(propylene-co-10-undecen-1-ol).

* * * * *